(12) United States Patent
Singh et al.

(10) Patent No.: US 9,134,983 B2
(45) Date of Patent: Sep. 15, 2015

(54) UNIQUELY IDENTIFYING A MACHINE

(75) Inventors: Kalvinder Pal Singh, Miami (AU); Gavin George Bray, Robina (AU); Elizabeth Marie Hughes, Currumbin Valley (AU)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 13/346,048

(22) Filed: Jan. 9, 2012

(65) Prior Publication Data

US 2013/0179548 A1 Jul. 11, 2013

(51) Int. Cl.
*G06F 15/177* (2006.01)
*G06F 9/445* (2006.01)
*H04L 29/12* (2006.01)

(52) U.S. Cl.
CPC . *G06F 8/61* (2013.01); *H04L 61/15* (2013.01); *H04L 61/20* (2013.01)

(58) Field of Classification Search
CPC ... H04L 41/08; H04L 41/0806; H04L 41/082; H04L 41/0866; H04L 41/0869; H04L 67/34; H04L 12/2424
USPC .................................................. 709/220–222
See application file for complete search history.

(56) References Cited

U.S. PATENT DOCUMENTS

| | | | |
|---|---|---|---|
| 7,180,422 B2 | 2/2007 | Milenkovic et al. | |
| 7,428,587 B2 | 9/2008 | Rowland et al. | |
| 7,512,675 B2 | 3/2009 | Sandaire | |
| 7,565,323 B2 | 7/2009 | Hughes et al. | |
| 7,610,483 B2* | 10/2009 | Currid et al. | 713/100 |
| 7,802,084 B2* | 9/2010 | Fitzgerald et al. | 713/2 |
| 8,131,875 B1* | 3/2012 | Chen et al. | 709/246 |
| 2005/0027657 A1* | 2/2005 | Leontiev et al. | 705/59 |
| 2005/0256973 A1 | 11/2005 | Holtz et al. | |
| 2008/0154957 A1* | 6/2008 | Taylor et al. | 707/104.1 |
| 2008/0288771 A1 | 11/2008 | Kulakowski et al. | |
| 2009/0182928 A1* | 7/2009 | Becker et al. | 711/6 |
| 2010/0333081 A1* | 12/2010 | Etchegoyen | 717/172 |
| 2012/0110574 A1* | 5/2012 | Kumar | 718/1 |
| 2012/0311115 A1* | 12/2012 | Kennedy et al. | 709/222 |
| 2014/0359620 A1* | 12/2014 | Van Kerkwyk et al. | 718/1 |

\* cited by examiner

*Primary Examiner* — Duyen Doan
(74) *Attorney, Agent, or Firm* — Jeffrey S. LaBaw; David H. Judson

(57) ABSTRACT

An endpoint machine has a unique endpoint identifier based on a configurable set of hardware attributes for an endpoint type. The endpoint agent running on that machine has an associated software identifier registered with the endpoint management solution upon install. The management server generates the unique endpoint identifier and provides it to the endpoint agent. Periodically, checks are run on the endpoint by the endpoint agent to determine if any of the hardware attributes have changed. If so, the endpoint identifier and the new hardware attribute values are sent to the management server, which uses the information to recognize the endpoint as the same endpoint or to detect a clone of known endpoint. If the endpoint type is unknown or does not exist, the unique software identifier may be used to facilitate the identification process, including the ability to detect a cloned machine.

25 Claims, 5 Drawing Sheets

US 9,134,983 B2

UNIQUELY IDENTIFYING A MACHINE

BACKGROUND

1. Technical Field

This disclosure relates generally to identifying machines in a computing environment.

2. Background of the Related Art

In a large organization, there are often many different types of machines, sometimes known as "endpoints." The different types of machines often have very different characteristics. Uniquely identifying machines and consistently tracking the unique identifiers is important when managing a large number of machines in an enterprise environment. To this end, management systems for identifying and tracking machines within an enterprise are known. Most management software of this type is designed to manage individual instances of an operating system (OS). Typically, however, the management software is not concerned whether or not the OS is installed on laptops or virtual machines. This complicates the effective management of such machines as operating conditions change.

Software to identify an endpoint machine may execute on the machine itself, or on a server to which the machine is connected. Current techniques to identify a machine include several approaches. One approach uses network attributes, such as IP address, hostname, and MAC address. Such network attributes, however, typically change over time. For example, typically an IP address and hostname may be set by a DHCP server, and a laptop or other mobile device may have several different MAC addresses available to it from connections provided by Ethernet, wireless, or a removable 3G wireless card. Another known approach to identify a machine is to use hardware attributes of the machine, such as processor type, processor serial number, system volume serial number, model, manufacturer, and the like, akin to a "fingerprint." While such information is invariant, it is not useful in a virtual environment, as these values may change depending on where the virtual machine is running. In addition, as machines are cloned (e.g., either using backup software or virtual management software), such cloning necessarily impacts the ability of the management software to correctly identify and/or track the machine in question.

It is desired to provide an enhanced technique to uniquely identifying machines in a computing environment that is robust enough to enable a particular machine to be recognized even in the face of changes to one or more attributes of the machine, repair of the machine or some component thereof, changing MAC addresses, or even cloning. This disclosure addresses this need.

BRIEF SUMMARY

An endpoint management solution comprises an endpoint management server, and a set of endpoint agents executing on endpoint machines within a computing environment. An endpoint machine has a unique endpoint identifier that is preferably based on a configurable set of hardware attributes for an endpoint type associated with the machine. The endpoint agent running on that machine has an associated software identifier, preferably the executable name registered with the endpoint management solution upon install of the agent. The management server generates the unique endpoint identifier and provides it to the endpoint agent. Periodically, checks are run on the endpoint by the endpoint agent to determine if any of the hardware attributes have changed. If so, the endpoint identifier and the new hardware attribute values are sent to the management server, which uses the information to recognize the endpoint as the same endpoint or to detect a clone of known endpoint. This determination is based on the endpoint type if the type is known to the management server. If the endpoint type is unknown or does not exist, the unique software identifier may be used to facilitate the identification process, including the ability to detect a cloned machine.

This disclosure thus provides a technique for uniquely identifying computer hardware endpoints and, once identified, consistently tracking an endpoint across hardware changes. The technique also detects a potential clone of a known endpoint that should be given a new unique identifier.

In one embodiment, a method of identifying and tracking endpoints in a computing environment begins by defining one or more endpoint types, each endpoint type comprising a configurable set of hardware attributes. A unique endpoint identifier is then generated for an endpoint based on a selected endpoint type and values of the set of hardware attributes. Thereafter, and upon receipt of an indication from an endpoint that a value of one of the hardware attributes has changed, the method determines whether an endpoint associated with the changed value is the endpoint identified by the unique endpoint identifier or a clone that is using the endpoint's identity.

In an alternative embodiment, the above-described method is performed in an apparatus. The apparatus comprises a processor, and computer memory that holds computer program instructions executed by the processor to carry out the information classification change detection method.

In another alternative embodiment, the above-described method is performed by a computer program product in a computer readable medium for use in a system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
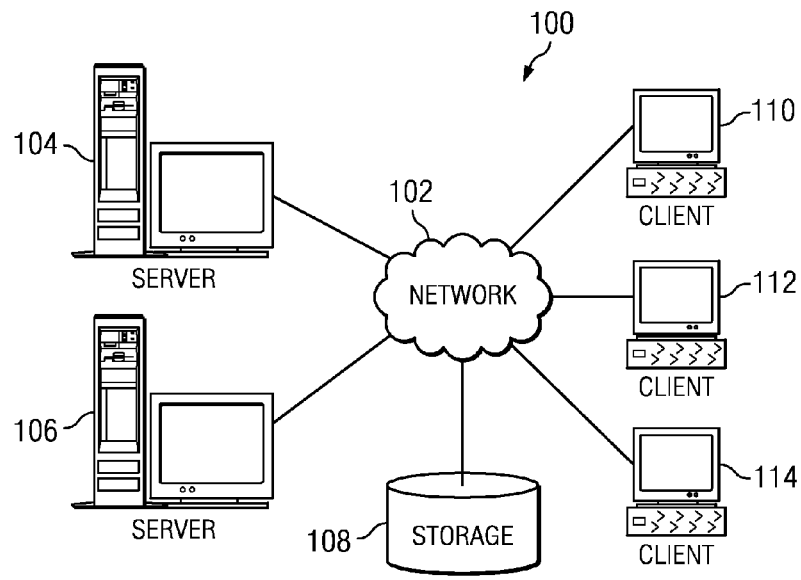
FIG. 1 depicts an exemplary block diagram of a distributed data processing environment in which exemplary aspects of the illustrative embodiments may be implemented.
Figure 2:
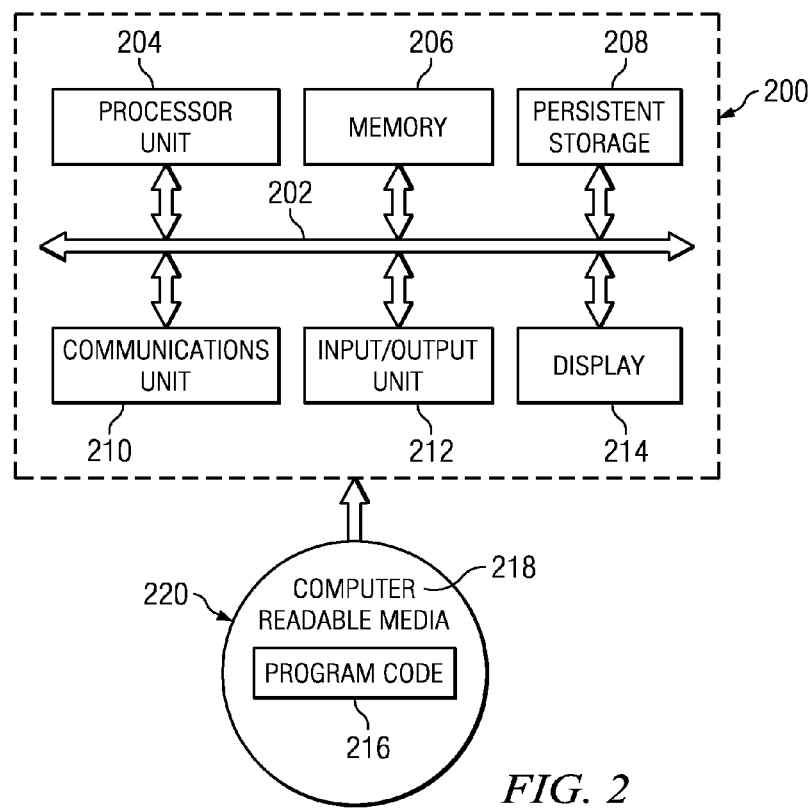
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
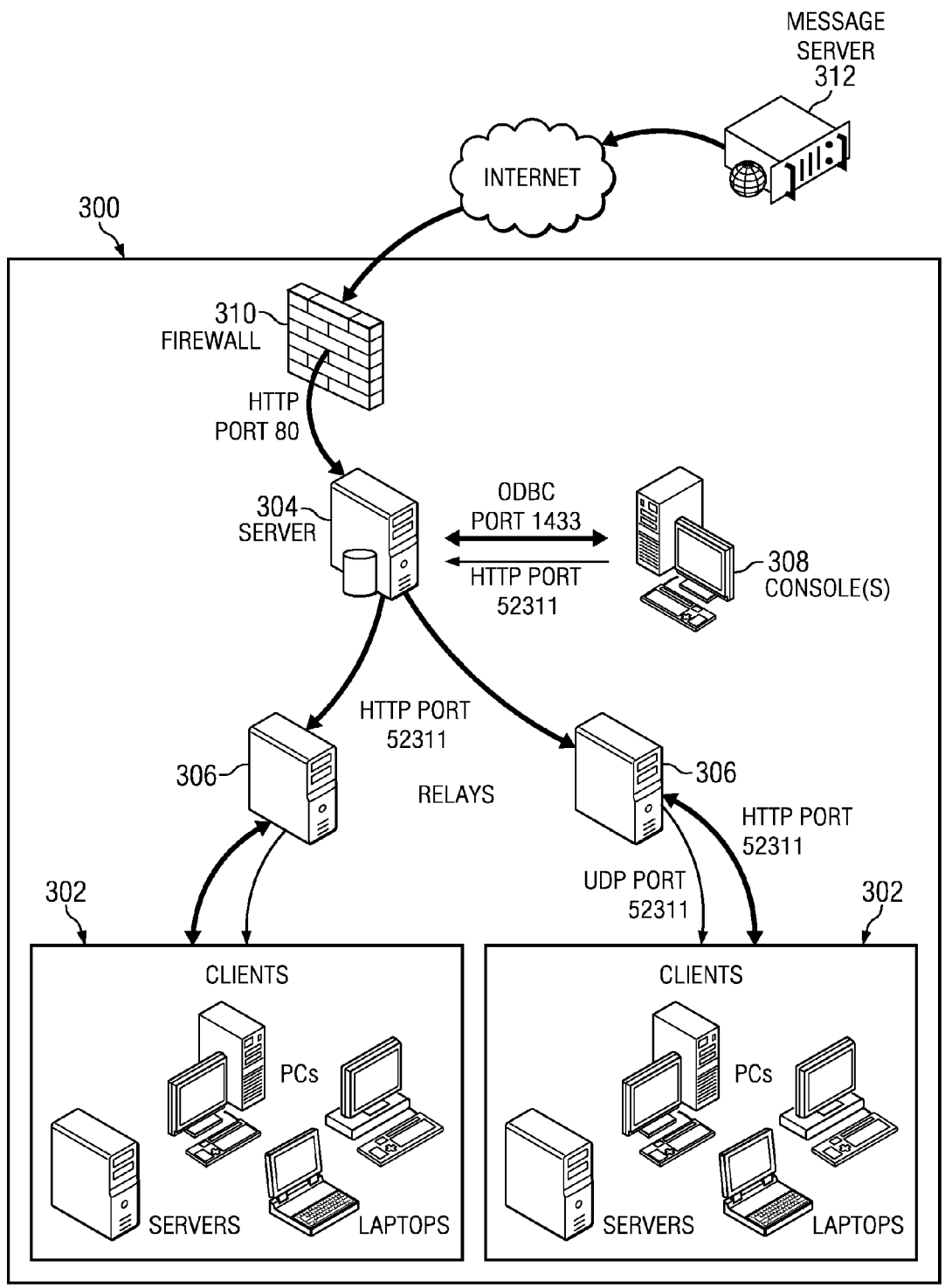
FIG. 3 illustrates a distributed computing environment in which the subject matter of this disclosure may be implemented.

FIG. 3 illustrates a representative endpoint manager system 300 in which the disclosed technique may be implemented. The endpoint manager 300 may be a standalone system, or it may be a component of another system, such as a "data loss prevention" (DLP) solution, which are used to reduce the risk of sensitive data loss. The endpoint manager system 300 typically is operative across one or more administrative domains of an enterprise comprising a large number of computing devices, typically within a firewall 310. In this illustrative but non-limiting embodiment, the endpoint manager system comprises a set of component types, such as a client 302, a server 304, a relay 306, and a console 308. Typically, there are many clients, servers and relays, and one or more consoles. Although not meant to be limiting, a representative system of this type is IBM® Tivoli® Endpoint Manager Version 8.1. A client 302, also called an agent, is installed on each computer (such as shown in FIG. 2) that is to be managed by the endpoint manager system 300. The endpoint system manager client 302 accesses a collection of messages that detect security holes, improper configurations, and other vulnerabilities. The messages may also comprise instructions to the agent to perform a management or reporting action. Such messages can be programmed to target specific groups of devices to perform management actions. The client implements corrective actions received from the console 308 through the server 304. Preferably, the client runs undetected by the end users and uses a minimum of system resources. The client encrypts upstream communications, protecting sensitive information. The endpoint manager system server 304 provides a collection of interacting services, including application services, a web server, and a database server (e.g., a SQL server). These services coordinate the flow of information to and from individual computers and store the results in an associated endpoint manager database. The endpoint manager server preferably operates in the background, without requiring direct intervention from an administrator. The server may include a native web reporting module to allow authorized users to connect through a web browser to view information about computers, vulnerabilities, actions, and the like. The endpoint manager system relay 306 is optional, but it may be used to spread load across the system. The manager console 308 provides a system-wide view of all the computers in the network, along with their vulnerabilities and suggested remedies. The console allows an authorized user to quickly and simply distribute fixes to each computer that needs them without impacting any other networked computers. To complete the setup, typically The arrows in the diagram illustrate the basic flow of information throughout the enterprise. In operation, the arrow from the external messaging server 312 to the server 304 represents the flow of messages into the network. Clients 302 gather these messages, as well as action information, from the relays 306. The client 302 then send small amounts of information back to the servers 304 through the relays 306. The UDP packets from the relay 306 to the clients 302 are small packets set to each client to inform them that there is new information to be gathered. The servers 304 make connections to the Internet using port 80. Each server typically has access to (or operates) a SQL server. Each console operator can make an ODBC connection to the database and an HTTP connection to the server. Each client makes an HTTP connection to a server or a relay on the specified port.

Each computer being managed by the system needs to be uniquely identified. This is the problem addressed by this disclosure.

Uniquely Identifying a Machine

As will be seen, preferably the endpoint management solution described herein preferably includes both a client computer, as well as a server component. The client component may comprise part of the client 302, as previously described, whereas the server component may comprise part of the server 304, as previously described. This is not a limitation. The client component, which is sometimes referred to as an endpoint agent, may operate in a standalone manner, or it may be part of any other software executed on a particular machine to be identified Likewise, the server component may operate in a standalone manner, or it may be part of any other software executed on a machine or set of machines. The server component need not be located within the enterprise, although typically it will be. The server component also may be implemented as a cloud-based component or functionality. The server component is sometimes referred to herein as an endpoint management server, or just the management server.

According to this disclosure, one or more endpoint "types" are defined, with each type having a configurable set of one or more attributes, which are preferably hardware attributes. Thus, each endpoint type is configurable and comprises one or more attributes that can be used to uniquely identify an endpoint. As will be seen, if a predetermined attribute (or set of attributes) of an endpoint changes, the technique of this disclosure is used to recognize it as the same endpoint, or to detect a clone of a known endpoint that may require a new unique identifier to be assigned to the cloned instance.

Endpoint types may be defined manually, programmatically, or in any other convenient manner. One technique uses a command line or graphical user interface from which an authorized user can define an endpoint type. One endpoint type may be on the make and machine model, another endpoint type may be based on processor type and processor serial number. While hardware characteristics (attributes) are preferred, this is not a limitation. Any set of one or more attributes, or combinations thereof, may be used. Of course, the particular hardware attributes to use for a particular type should be determined based on various factors such as the type of machine, how the machine is being used or will be used, the type of operating conditions, and the like. Thus, for example, on some virtual environments, a Processor Serial Number may not be unique and additional attributes would be needed to uniquely identify such an endpoint. An endpoint type typically is stored within or in association with the endpoint agent. An endpoint agent typically provides its endpoint type in communications with the endpoint management server.

According to this disclosure, an endpoint agent itself also has a unique software identifier that is generated when the endpoint is registered with the endpoint management software, typically upon install on the endpoint. The unique software identifier (for the endpoint agent) preferably is distinct from other identifiers that may be associated with the particular software components installed on the machine upon which the agent is running. The endpoint agent software identifier has an executable name associated therewith. For each install of an agent on an endpoint, the executable name of the endpoint agent (or a particular instance of the endpoint agent) preferably is unique. At install time, this executable name is registered (at the endpoint), and the name can be provided to the management server to facilitate identity management in the event an endpoint type is not available. In addition to the executable name, the endpoint agent may have a set of properties that also define it uniquely, such as its location (in storage), its file size, its date of installation, and the like. These properties may be used to supplement the executable name as the unique software identifier for the endpoint agent, or one or more such properties may be used (as the unique software identifier for the endpoint agent) in lieu of that name if the name is not available or trusted.

Thus, according to this disclosure, an endpoint machine has a unique endpoint identifier that is preferably based on a configurable set of hardware attributes for an endpoint type associated with the machine. The endpoint agent running on that machine has an associated software identifier, preferably the executable name registered with the endpoint management solution upon install of the agent. The management server generates the unique endpoint identifier and provides it to the endpoint agent. Periodically, checks are run on the endpoint by the endpoint agent to determine if any of the hardware attributes have changed. If so, the endpoint identifier and the new hardware attribute values are sent to the management server, which uses the information to recognize the endpoint as the same endpoint or to detect a clone of known endpoint. This determination is based on the endpoint type if the type is known to the management server. If the endpoint type is unknown or does not exist, the unique software identifier may be used to facilitate the identification process, including the ability to detect a cloned machine.

Figure 4:
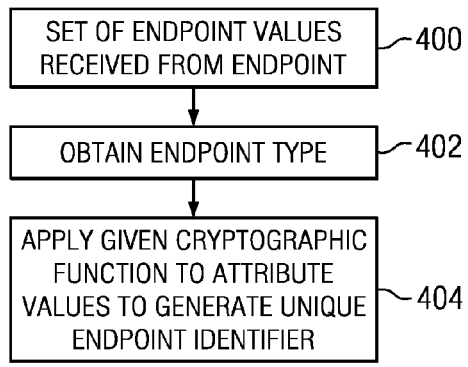
FIG. 4 is a process flow diagram illustrating an algorithm for calculating a unique endpoint identifier according to this disclosure.

FIG. 4 illustrates a representative process flow diagram for an algorithm to generate a unique endpoint identifier according to this disclosure. Preferably, the process is implemented in software, as computer program executed by a processor, running on a management server, such as server 304 in FIG. 4. This is not a limitation, however. In this process flow, it is assumed that the endpoint management server knows or can ascertain an endpoint type (and thus the one or more attributes to use). The routine begins at step 400 upon receipt of a set of endpoint characteristics. Preferably, the endpoint characteristics are one or more hardware characteristics that are received as a set of attribute values. Typically, the attribute values comprise one or more of the following: BIOS UUID, BIOS Serial Number, Processor Type, Processor Serial Number, System Volume Serial Number, SCSI Adaptor Identifier, IDE Adaptor Identifier, Primary MAC Address, Model, Manufacturer, one or more other Endpoint Properties. The one or more other Endpoint Properties also are configurable and may be found in a properties file located on the endpoint.

Without limitation, any convenient programmatic technique may be used to collect such information, e.g., using Desktop Management Interface (DMI) for UNIX®-based systems, Web-Based Enterprise Management (WBEM) interface for Microsoft® Windows®-based systems, or the like. The particular set or subset of attribute values to use preferably is configurable per endpoint type. At step 402, the endpoint type is obtained. As noted above, the endpoint type determine which of the one or more attributes will be used to generate the unique identifier. At step 404, the one or more attributes (as determined by the endpoint type) are applied to a given function to generate the unique endpoint identifier. Although not meant to be limiting, a preferred function is the Secure Hash Algorithm-1 (SHA-1), which is a cryptographic function that generates a message digest one the set of one or more input values in a known manner. Other unique identifiers (message digests) may be generated using other cryptographic functions such as, without limitation, MD4, MD5, CBC_MAC, and the like. The output of the cryptographic function is a message digest that is the endpoint unique identifier for the particular endpoint type.

Figure 5:
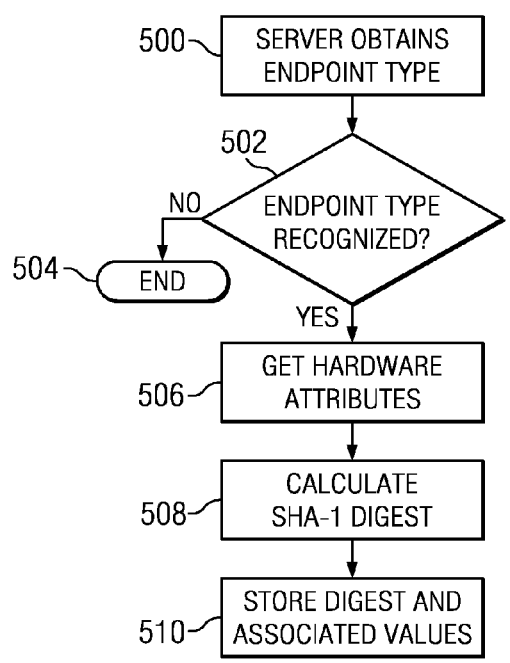
FIG. 5 is process flow diagram that illustrates a process implemented at the management server to calculate an endpoint identity for a first time.

FIG. 5 illustrates a process flow diagram used by the management server to calculate an endpoint identity for the first time. This routine is used if an endpoint identity does not yet exist but the endpoint type is known to the management server. The routine begins at step 500 with the server obtaining an endpoint type. At step 502, a test is performed to determine if the endpoint type is recognized. If the endpoint type is not recognized, the routine branches to step 504 and ends. If, however, the endpoint type is recognized, the routine continues at step 506 to get the required hardware attributes for the endpoint type (such as described in FIG. 4). At step 508, the routine then calculates the SHA-1 message digest from the required hardware attributes. This operation was described above with respect to FIG. 4. At step 510, the calculated message digest is stored as the endpoint identity. The endpoint identity is stored on the management server, and on the endpoint itself, which receives the endpoint identity from the management server. Preferably, the endpoint identifier is stored in association with the hardware attributes of the endpoint that were used to calculate the identifier (or some reference to those hardware attributes). The identity and attributes may be stored in disk, in memory, or the like. The process then ends.

Figure 6:
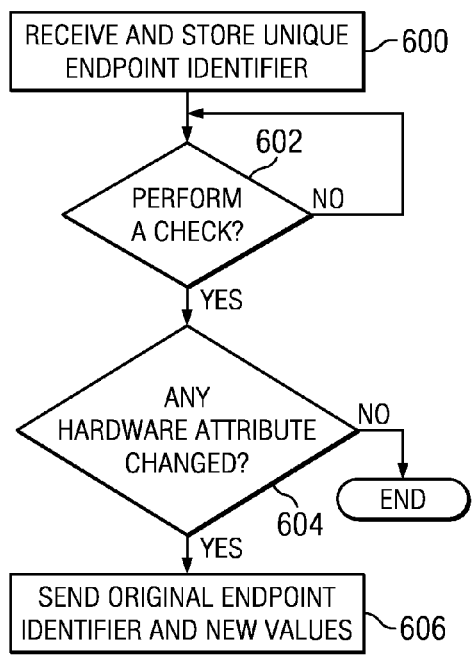
FIG. 6 is a process flow diagram that illustrates a process implemented on an endpoint to determine whether any hardware attribute used to generate the endpoint identity have changed.

With reference now to FIG. 6, a process flow is shown for a routine that executes on the endpoint machine to determine whether any of the hardware attributes used to generate the endpoint identity have changed. This routine begins at step 600 to receive (from the management server) and store the unique identity for the endpoint type. This was step 510 in FIG. 5, as previously described. At step 602, a test is performed to determine whether a check should be performed. Preferably, the interval between checks is configurable. If an outcome of the test at step 602 is negative, the routine cycles. If, however, if the outcome of the test at step 604 is positive, a check is made to determine if any of the hardware attributes that were used to calculate the identifier have changed. If not, the routine returns. If, however, the outcome of the test at step 604 is positive (indicating that one or more of the hardware attributes used to calculate the identifier have changed), the routine continues at step 606. At this step, the endpoint identifier and the new hardware values are sent up to the management server (for new calculations), as will be described below.

Thus, according to the process flows in FIG. 5 and FIG. 6, the endpoint identifier is generated and stored on the server and the endpoint, together with the hardware attributes of the endpoint. Periodic checks are then performed on the endpoint to see if any of the hardware attributes have changed. If the hardware attributes have changed, the endpoint identifier and the new hardware attribute values are sent up to the server.

Figure 7:
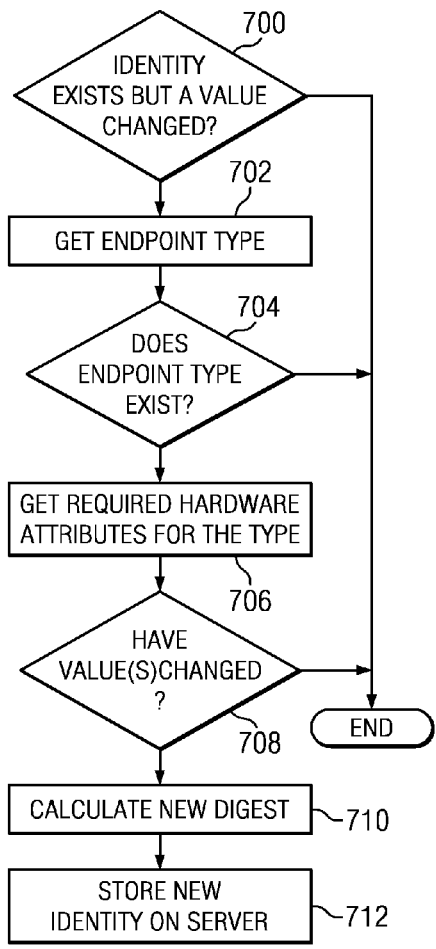
FIG. 7 is a process flow diagram that illustrates a process implemented on the management server when an endpoint type is known to determine if a new endpoint identity should be calculated.

If the endpoint is known and has an existing identity and there are hardware changes, then a check should be performed to determine if the endpoint is still the same endpoint. This process, which may occur as a result of executing the routine in FIG. 6, is now described, with respect to the process flow in FIG. 7. In particular, it may be that the endpoint had some hardware replaced or repaired but that these changes (identified by executing the routine in FIG. 6) did not affect the set of attributes used to determine the unique identifier; in such case, the endpoint is considered to be the same endpoint. On the other hand, the check (in FIG. 6) may detect that a cloned image of the endpoint is using the original endpoint's identity. When the unique identifier then is recalculated based on the provided hardware attributes, it will be detected that this endpoint is not the same as the original endpoint and needs its own unique identifier. Thus, FIG. 7 provides a way to check if a new identity should be calculated in the event the management server has previously created an endpoint identity, one or more hardware attributes change (as detected in FIG. 6), and the endpoint type is known.

The routine begins at step 700 to determine if the endpoint identity exists and one or more attributes used to establish that identity have changed. If not, the routine ends at step 705. If the outcome of the test is positive, the routine continues at step 702 to get the endpoint type associated with the endpoint identity. A test is then performed at step 704 to determine if the endpoint type exists. If not, the routine ends (and an alternative process, as described below in FIG. 8, may be implemented). If the endpoint type exists, however, the routine then continues at step 706 to get the required hardware attributes for the endpoint type. A test is then performed at step 708 to determine if the required hardware attribute values have changed on the endpoint. If not, once again the routine ends. If, however, the outcome of the test at step 708 is positive, which indicates that one or more of the hardware attributes have changed, then the routine continues at step 710 to calculate a new digest from the hardware attributes that have been provided (typically, from the routine shown in FIG. 6). Preferably, the same cryptographic function (e.g., SHA-1) is used to generate the new identity. At step 712, the digest is stored as the endpoint identity on the server and the endpoint and the process ends.

Thus, and by way of example only, if the Processor Serial Number is used to generate the endpoint identity (in FIG. 5) but then changes (as determined by FIG. 6) on a laptop because the CPU has changed, then (as a result of executing the routine in FIG. 7), the laptop can be considered a new machine. The technique also works in the context of a cloned machine. Thus, for example, if a virtual image was copied and the Processor Serial Number had not changed (because it is on the same hardware) but the Primary MAC Address has changed, then the resulting clone can be considered a new machine. Thus, implementation of the disclosed technique provide proper machine tracking both for physical and cloned machines. Thus, using the technique described, if certain hardware attributes change on a virtual machine, it will be considered a new machine, and if different (but they can be the same) hardware attributes change on real hardware, then it will be considered a new machine.

Figure 8:
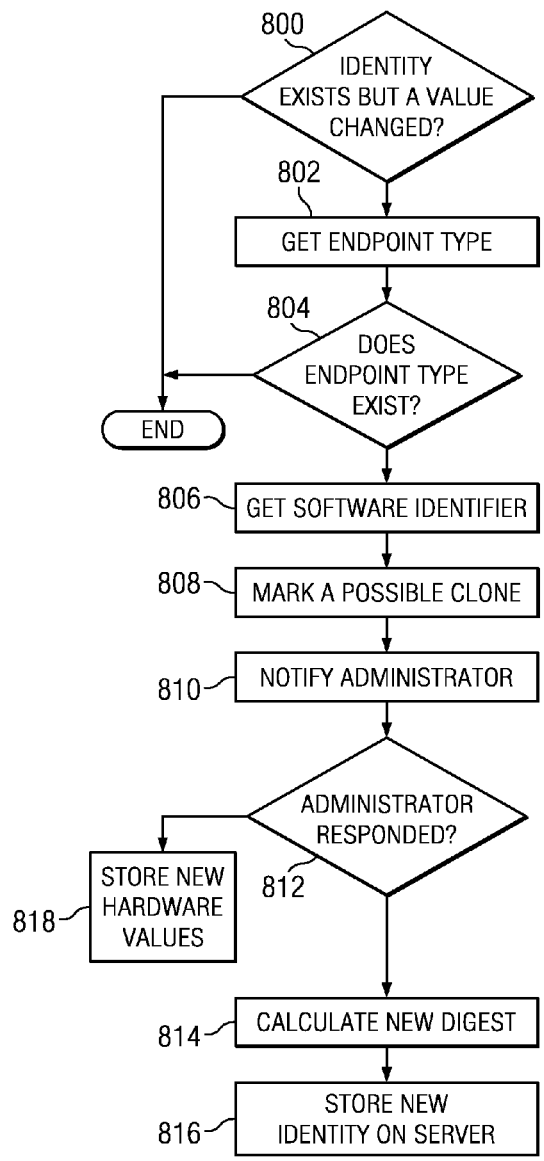
FIG. 8 is a process flow diagram that illustrates a first process implemented on the management server when an endpoint type is unknown to determine if a new endpoint identity should be calculated.

In some cases, however, the server (upon receiving an update from the endpoint as described in FIG. 6) may not have the knowledge or enough information to ascertain the type of machine the endpoint is (i.e., the endpoint type). As noted above, the endpoint type is normally sent to the server by the endpoint agent, although the server may also have access to this information from other sources. Without knowing the type of machine, the endpoint management software cannot determine the type of algorithm to use to uniquely identify a machine. To address this scenario, preferably another unique identifier is used to augment the endpoint identity. This additional unique identifier identifies a software installation on the endpoint. FIG. 8 illustrates a process flow for this scenario.

The routine begins at step 800 to determine if the endpoint identity exists and one or more attributes used to establish that identity have changed. If not, the routine ends. If the outcome of the test is positive, the routine continues at step 802 to get the endpoint type associated with the endpoint identity. A test is then performed at step 804 to determine if the endpoint type does not exist. If not (if the endpoint type does exist), the routine ends (as this is the scenario described above with respect to FIG. 7). If the outcome of the test at step 804 is positive, which indicates that the endpoint type does not exist, the routine continues at step 806 to obtain a software identifier (e.g., a pre-existing identifier for the installed endpoint agent software, a name of a particular executable, or the like, as will be described below). At step 808, the machine is marked as a possible clone. The routine then continues at step 810 to notify an administrator (e.g., by an alert, an e-mail, or the like) of the possible cloned machine. A test is then performed at step 812 to determine whether the administrator has responded to the notification by indicating that a clone has been implemented and that a new endpoint identity for that clone should be generated. If the administrator has responded affirmatively to the notification, the routine continues at step 814 to calculate a new endpoint identity for the clone (in the manner previously described). The new endpoint identity and the associated hardware information are then stored at step 816. If, however, the administrator responds negatively, however, the routine simply stores the new hardware information at step 818. The process then terminates.

Thus, by way of example, if an operating system (OS) is copied, then at the same time, there will be two machines with different hardware characteristics but with the same installation identifier. When discovering this scenario, the server can send a request down to the endpoint to update the installation identifier or report it to the administrator (who can then perform the correct operation).

Figure 9:
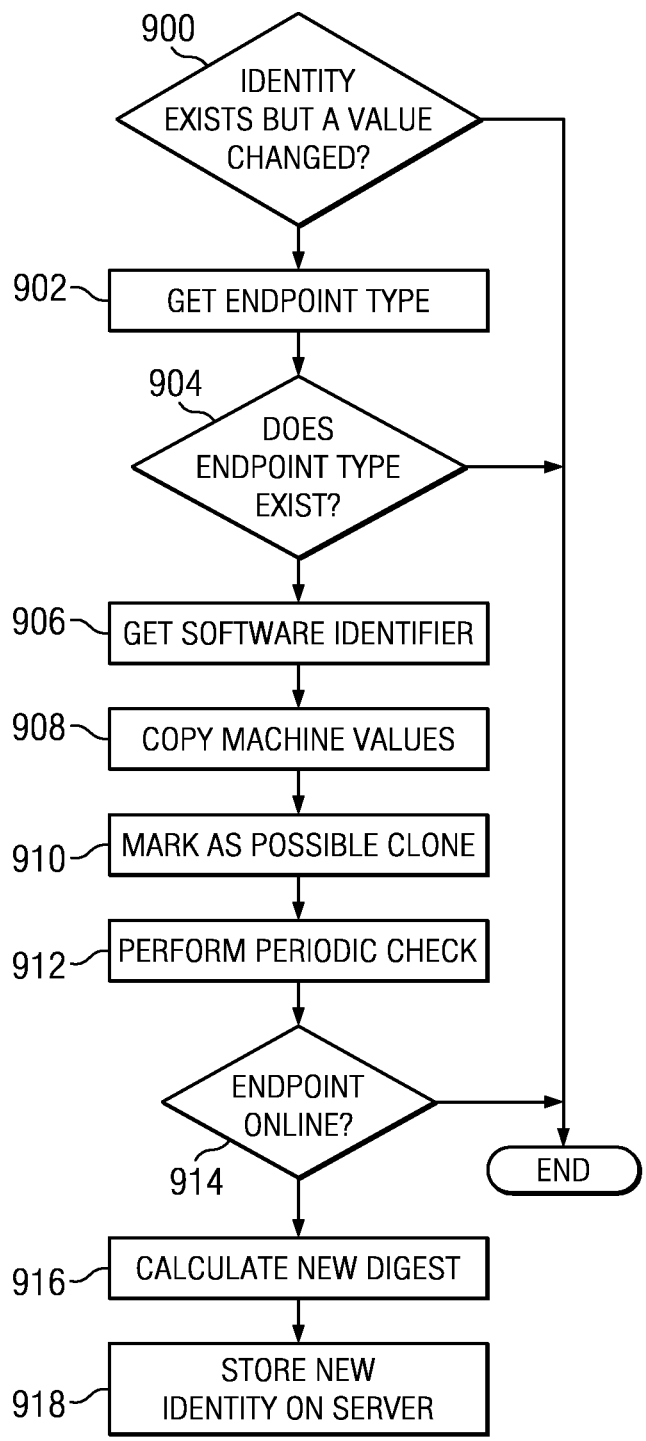
FIG. 9 is a process flow diagram that illustrates a variant of the process shown in FIG. 8.

In an alternative embodiment to FIG. 8, it is not required to send a notification to the administrator and/or wait for a response. In this alternative, the process works in an automated manner, as will now be described with respect to FIG. 9.

The routine begins at step 900 to determine if the endpoint identity exists and one or more attributes used to establish that identity have changed. If not, the routine ends. If the outcome of the test is positive, the routine continues at step 902 to get the endpoint type associated with the endpoint identity. A test is then performed at step 904 to determine if the endpoint type does not exist. If not (if the endpoint type does exist), the routine ends (as this is the scenario described above with respect to FIG. 7). If the outcome of the test at step 904 is positive, which indicates that the endpoint type does not exist, the routine continues at step 906 to obtain a software identifier, preferably an executable name associated with the endpoint agent. At step 908, the routine makes a copy of the machine values that are currently stored in a database associated with the management server. At step 910, the machine is marked as a possible clone of the original machine. The routine then continues at step 912 to perform periodic checks to determine whether the original machine comes back online. Then, at step 914, the routine performs a test to determine if the original machine is online. If not, the routine ends. If, however, the test at step 914 determines that the original machine is online, the routine continues at step 916 to calculate a new endpoint identity for the clone (in the manner previously described). The new endpoint identity and the associated hardware information are then stored at step 918. The process then terminates.

Thus, in this alternative scenario (wherein the process is automated, and with no request sent to the administrator), the management server waits for a configurable time period and checks if an endpoint is online, using the old hardware attributes and software identifier. If there is, then the server assumes that the endpoint, with the changed hardware attribute values, is a clone of the original machine. In the FIG. 9 embodiment, the detection of a cloned machine is done automatically, although the technique does require that the original machine come back online at some point.

The particular software identifier (used in the FIG. 8 and FIG. 9 embodiments) may be provided in any convenient manner. In one approach, given attributes of the installed agent software (such as location, file size, installation date, or the like) may be used as a unique software identifier or to calculate that software identifier. In an alternative, the executable name itself (e.g., the name of the executable or the program) is used as the unique identifier. In the latter approach, when the program is installed on the machine, a unique name is generated and becomes the name of the program for the purposes of the disclosed technique. For instance, a unique GUID is generated during the install period for the machine, and the GUID is used by the install process to name the executable. Certain endpoint management software has the ability to register names of the executable. In this case, if the operating system is copied, the executable name is copied as well. Then, if two machines have the same executable name, the server management software can detect this fact. In this scenario, after it has been determined that a machine is a clone, a request can be sent down from the management server to the endpoint agent to change the name of the executable.

If a machine has been determined to have been cloned, then preferably the management server sends the endpoint a message informing the cloned machine of the new GUIDs/identifiers it should be using. Upon receiving such a message, any old key management certificates or other secure secrets can be deleted, and new security credentials are then provided to the endpoint (which, in effect, is a new machine).

The subject matter described herein has many advantages. A main advantage is that cloned endpoints are given a unique identifier. Known solutions where the unique identifier is solely generated by the endpoint do not provide this function. Likewise, using the described technique a machine may have a hardware attribute changed without changing its identity, whereas other solutions where the unique identifier is generated by a server do not have the flexibility to discover whether it is a new machine or a repaired machine. Further, using the described approach, hardware (and, if needed, agent software) attributes can be used to discover cloned endpoints. Unlike other methods, the disclosed method allows tracking of the cloned endpoints and the original endpoint. This method also is flexible across many different endpoint management solutions, because the unique software identifier can be the name of an executable on the endpoint and does not depend on the particular software that is installed on the machine. Finally, the disclosed method provides a process to supply a new identity to a cloned endpoint as needed.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The technique described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the endpoint identity and tracking functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the process flows described above are implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing identity management and/or DLP solution.

Without meant to be limiting, preferably a management server management console exposes one or more web-based interfaces that may be used to create and/or modify an endpoint type, to set configuration parameters applicable to a particular endpoint type, to identify how the software identifier for an endpoint agent is assigned or determined, and the like.

The described functionality may be implemented as an adjunct or extension to an existing endpoint manager solution including, without limitation, an endpoint client (agent), an endpoint management or relay server, or the like.

While the above describes a particular order of operations performed by certain embodiments of the disclosed technique, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The reference to endpoint "type" should not be taken as limiting. Any set of one or more configurable attributes (whether hardware, network, software, or some combination thereof) may comprise what is, in effect (and however designated), a "type" as used herein.

Having described our invention, what we now claim is as follows:

1. A method of identifying and tracking endpoints in a computing environment, comprising:
    defining a set of distinct endpoint types, each endpoint type comprising a configurable set of hardware attributes;
    generating a unique endpoint identifier for an endpoint based on a selected endpoint type and values of the set of hardware attributes; and
    upon receipt of an indication from an endpoint that a value of one of the hardware attributes has changed, determining, based at least in part on the distinct endpoint types, whether an endpoint associated with the changed value is the endpoint identified by the unique endpoint identifier or a clone that is using the endpoint's identity;
    wherein at least the determining step is carried out in software executing in a hardware element.

2. The method as described in claim 1 wherein the determining step includes:
    determining whether the endpoint associated with the changed value is known and has an existing identity;

if the endpoint associated with the changed value is known and has an existing identity, determining whether an endpoint type exists for the endpoint associated with the changed value;

if the endpoint type exists for the endpoint associated with the changed value, creating a second unique identifier based on the endpoint type and the at least the changed value; and determining whether the second unique endpoint identifier matches the unique endpoint identifier.

3. The method as described in claim 2 wherein if the second unique endpoint identifier does not match the unique endpoint identifier, providing the second unique identifier to the endpoint associated with the changed value.

4. The method as described in claim 2 wherein if the endpoint type does not exist for the endpoint associated with the changed value, using a unique software identifier associated with an endpoint agent to determine whether the endpoint associated with the changed value is the endpoint identified by the unique endpoint identifier or a clone that is using the endpoint's identity.

5. The method as described in claim 4 wherein the unique software identifier is an executable name associated with the endpoint agent.

6. The method as described in claim 4 wherein if the endpoint associated with the changed value is determined to be a clone, providing the endpoint with a new unique endpoint identifier and a new unique software identifier.

7. The method as described in claim 1 wherein the unique endpoint identifier for the endpoint is generated by applying a cryptographic function to the values of the set of hardware attributes associated with the selected endpoint type.

8. Apparatus for identifying and tracking endpoints in a computing environment, comprising:
    a processor;
    computer memory holding computer program instructions that when executed by the processor perform a method comprising:
        defining a set of distinct endpoint types, each endpoint type comprising a configurable set of hardware attributes;
        generating a unique endpoint identifier for an endpoint based on a selected endpoint type and values of the set of hardware attributes; and
        upon receipt of an indication from an endpoint that a value of one of the hardware attributes has changed, determining, based at least in part on the distinct endpoint types, whether an endpoint associated with the changed value is the endpoint identified by the unique endpoint identifier or a clone that is using the endpoint's identity.

9. The apparatus as described in claim 8 wherein the determining step of the method includes:
    determining whether the endpoint associated with the changed value is known and has an existing identity;
    if the endpoint associated with the changed value is known and has an existing identity, determining whether an endpoint type exists for the endpoint associated with the changed value;
    if the endpoint type exists for the endpoint associated with the changed value, creating a second unique identifier based on the endpoint type and the at least the changed value; and
    determining whether the second unique endpoint identifier matches the first unique endpoint identifier.

10. The apparatus as described in claim 9 wherein if the second unique endpoint identifier does not match the first unique endpoint identifier, the method further provides the second unique identifier to the endpoint associated with the changed value.

11. The apparatus as described in claim 9 wherein if the endpoint type does not exist for the endpoint associated with the changed value, the method continues by using a unique software identifier associated with an endpoint agent to determine whether the endpoint associated with the changed value is the endpoint identified by the unique endpoint identifier or a clone that is using the endpoint's identity.

12. The apparatus as described in claim 11 wherein the unique software identifier is an executable name associated with the endpoint agent.

13. The apparatus as described in claim 11 wherein if the endpoint associated with the changed value is determined to be a clone, the method continues by providing the endpoint with a new unique identifier for the endpoint and a new unique software identifier.

14. The apparatus as described in claim 8 wherein the unique endpoint identifier for the endpoint is generated by applying a cryptographic function to the values of the set of hardware attributes associated with the selected endpoint type.

15. A computer program product in a non-transitory computer readable medium for identifying and tracking endpoints, the computer program product holding computer program instructions which, when executed by a data processing system, perform a method comprising:
    defining a set of distinct endpoint types, each endpoint type comprising a configurable set of hardware attributes;
    generating a unique endpoint identifier for an endpoint based on a selected endpoint type and values of the set of hardware attributes; and
    upon receipt of an indication from an endpoint that a value of one of the hardware attributes has changed, determining, based at least in part on the distinct endpoint types, whether an endpoint associated with the changed value is the endpoint identified by the unique endpoint identifier or a clone that is using the endpoint's identity.

16. The computer program product as described in claim 15 wherein the determining step of the method includes:
    determining whether the endpoint associated with the changed value is known and has an existing identity;
    if the endpoint associated with the changed value is known and has an existing identity, determining whether an endpoint type exists for the endpoint associated with the changed value;
    if the endpoint type exists for the endpoint associated with the changed value, creating a second unique identifier based on the endpoint type and the at least the changed value; and
    determining whether the second unique endpoint identifier matches the first unique endpoint identifier.

17. The computer program product as described in claim 16 wherein if the second unique endpoint identifier does not match the first unique endpoint identifier, the method further provides the second unique identifier to the endpoint associated with the changed value.

18. The computer program product as described in claim 16 wherein if the endpoint type does not exist for the endpoint associated with the changed value, the method continues by using a unique software identifier associated with an endpoint agent to determine whether the endpoint associated with the changed value is the endpoint identified by the unique endpoint identifier or a clone that is using the endpoint's identity.

19. The computer program product as described in claim 18 wherein the unique software identifier is an executable name associated with the endpoint agent.

20. The computer program product as described in claim 18 wherein if the endpoint associated with the changed value is determined to be a clone, the method continues by providing the endpoint with a new unique identifier for the endpoint and a new unique software identifier.

21. The computer program product as described in claim 15 wherein the unique endpoint identifier for the endpoint is generated by applying a cryptographic function to the values of the set of hardware attributes associated with the selected endpoint type.

22. Apparatus, comprising:
a processor;
computer memory holding computer program instructions that when executed by the processor perform a method operative on an endpoint machine, the method comprising:
receiving and storing a unique endpoint identifier, the unique endpoint identifier having been generated at a management server by applying a function to values of a configurable set of hardware attributes, the configurable set of hardware attributes defining an endpoint type of a set of distinct endpoint types;
determining, on a periodic basis, whether a value of one of the hardware attributes has changed;
if the value of one of the hardware attributes has changed, sending the management server the unique endpoint identifier and at least the changed value to enable the management server to determine whether the endpoint associated with the changed value is the endpoint identified by the unique endpoint identifier or a clone that is using the endpoint's identity.

23. The apparatus as described in claim 22 wherein the method further includes providing the management server with a unique software identifier.

24. The apparatus as described in claim 23 wherein the unique software identifier is an executable name.

25. The apparatus as described in claim 23 wherein the method further includes receiving and storing a new unique identifier and a new unique software identifier if the endpoint has been determined to be a clone.

\* \* \* \* \*